March 29, 1932. D. S. BAKER ET AL 1,851,534
APPARATUS FOR HANDLING MATERIALS
Filed Dec. 8, 1927 4 Sheets-Sheet 3
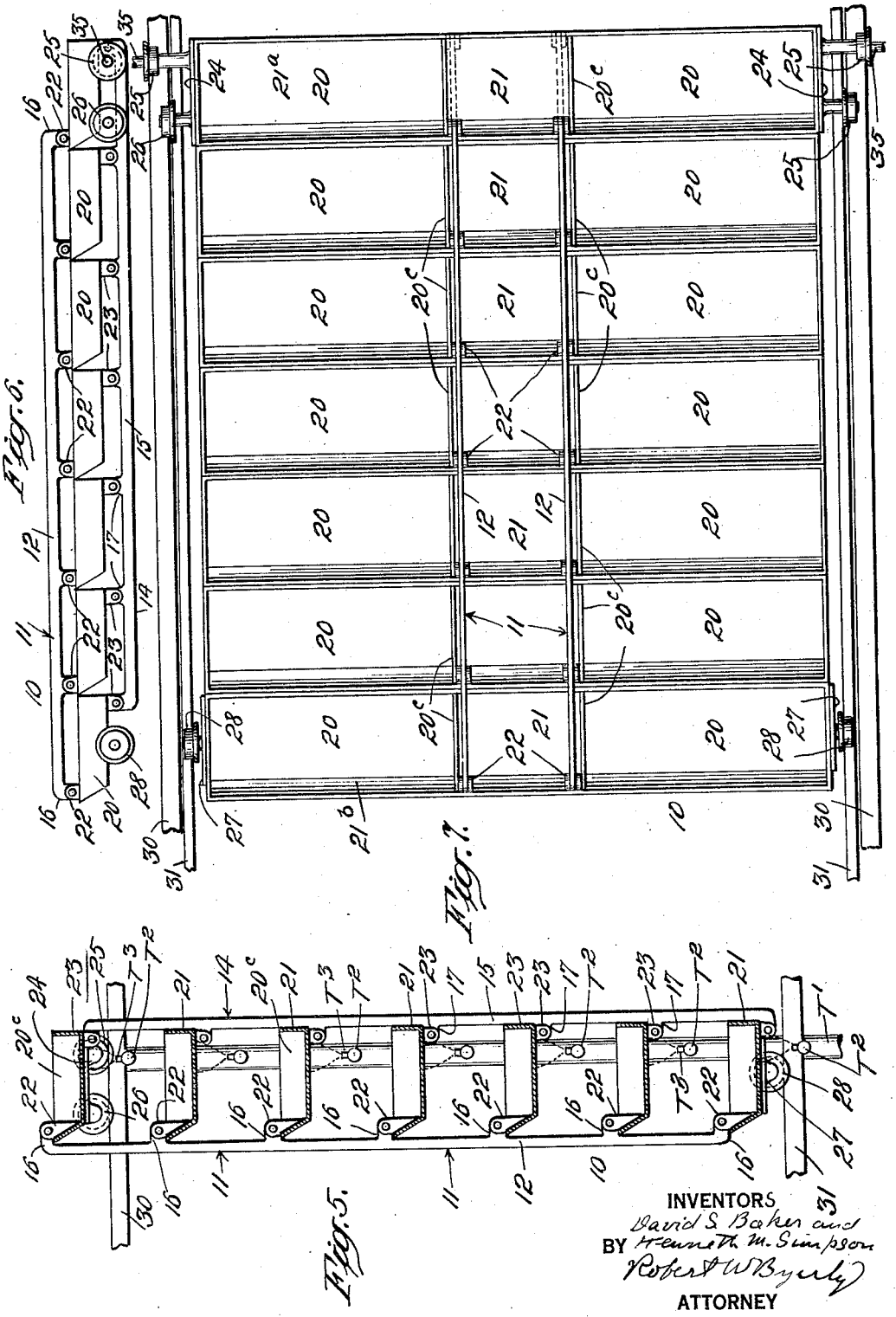
INVENTORS
David S. Baker and
BY Kenneth M. Simpson
Robert W. Byerly
ATTORNEY

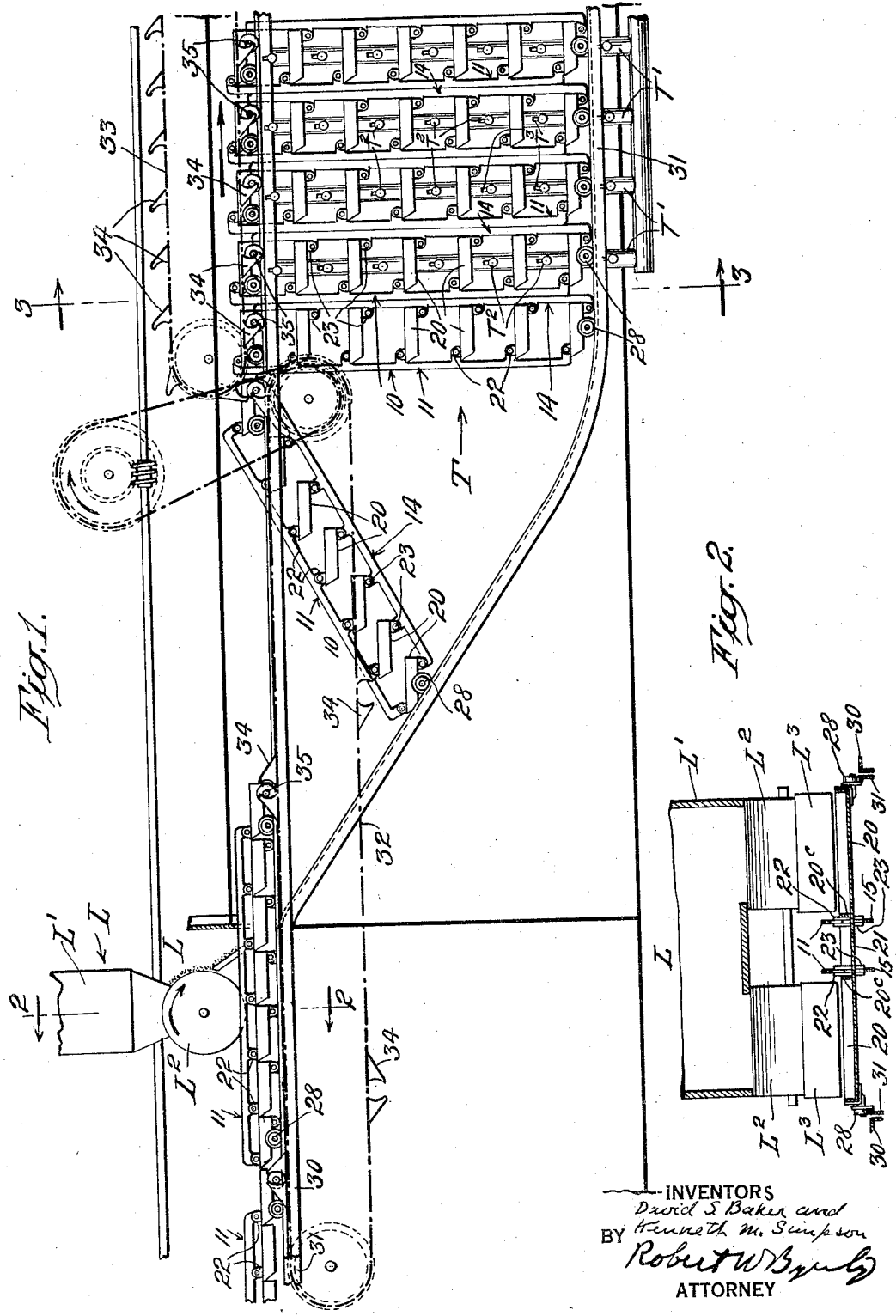

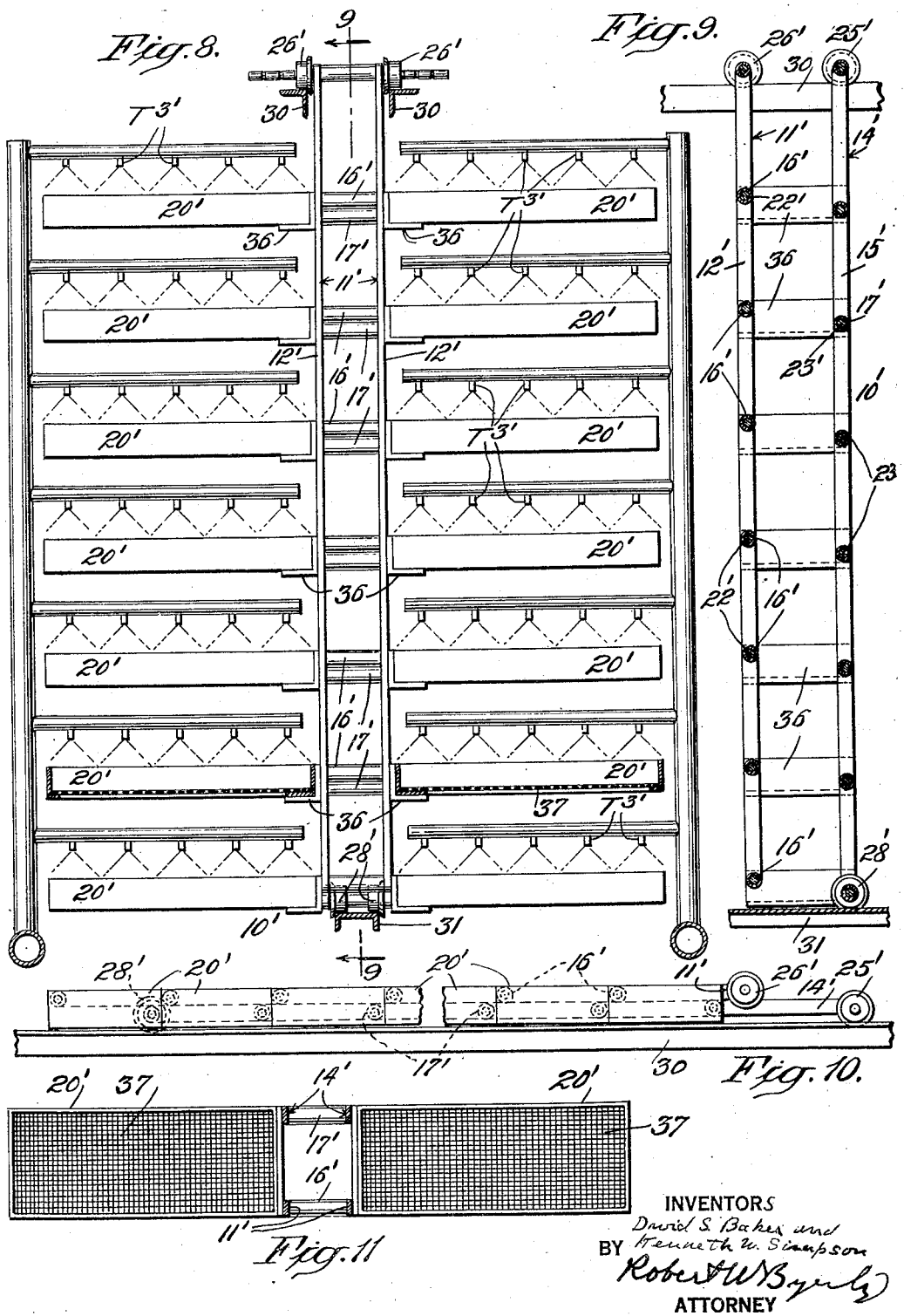

Patented Mar. 29, 1932

1,851,534

UNITED STATES PATENT OFFICE

DAVID S. BAKER, OF GREENWICH, CONNECTICUT, AND KENNETH M. SIMPSON, OF NEW YORK, N. Y.; SAID SIMPSON ASSIGNOR TO SAID BAKER

APPARATUS FOR HANDLING MATERIALS

Application filed December 8, 1927. Serial No. 238,506.

This invention relates to apparatus for handling and treating materials, and aims to bring superimposed layers of material to be treated in close proximity with treating means so that the material may be thoroughly and effectively treated by heat, cold liquids, gases, or other means, without any manual handling of the material.

Apparatus embodying the invention involves the combination of fixed, overhanging, superimposed, and structurally independent treating members with movable overhanging, superimposed, and unconnected carrying elements which, in their travel, intermesh with the treating members so as to bring the material on each carrying element in close proximity to one of the treating members.

A specific and important object of the present invention is to secure such intermeshing of carrying elements and treating members in a handling apparatus having collapsible carriers, of the type shown and claimed in the co-pending application of David S. Baker, Serial No. 150,443, filed November 24, 1926.

In order that the invention may clearly be understood, we will describe in detail specific handling apparatus of the type shown in the aforesaid Baker application, and embodying the present invention, which are illustrated in the accompanying drawings, in which:

Fig. 1 is a side elevation of part of a complete handling and treating apparatus showing the loading station, a part of the treatment space, and the means for moving carriers from the loading station to the treatment space;

Fig. 2 is a transverse section on the line 2—2 of Fig. 1;

Fig. 5 shows one of the carriers in the treatment space in central longitudinal section;

Fig. 6 is a side elevation of a carrier at the loading station, omitting the tracks which support the carrier;

Fig. 7 is a plan view of a carrier at the loading station, omitting the loading device and other parts above the carrier;

Fig. 8 is a view similar to Fig. 3 showing a modified apparatus;

Fig. 9 is a section on the line 9—9 of Fig. 8;

Fig. 10 is a side elevation of the carrier shown in Figs. 8 and 9, in loading position; and Fig. 11 is a plan view of the carrier shown in Fig. 8 in treating position.

Figure 3:
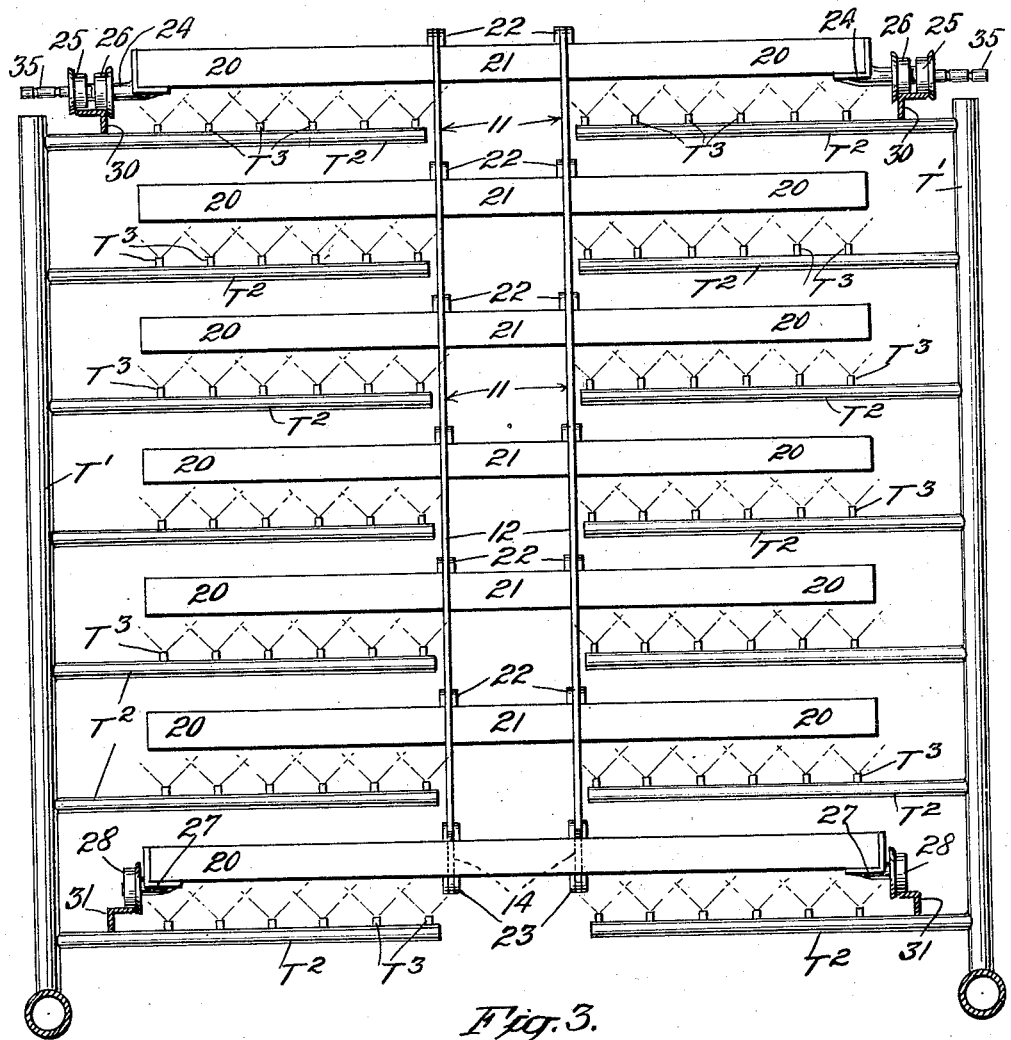
Fig. 3 is an enlarged transverse section taken on the line 3—3 of Fig. 1, and showing one of the carriers in the treatment space with its carrying element intermeshed with the treating members.
Figure 4:
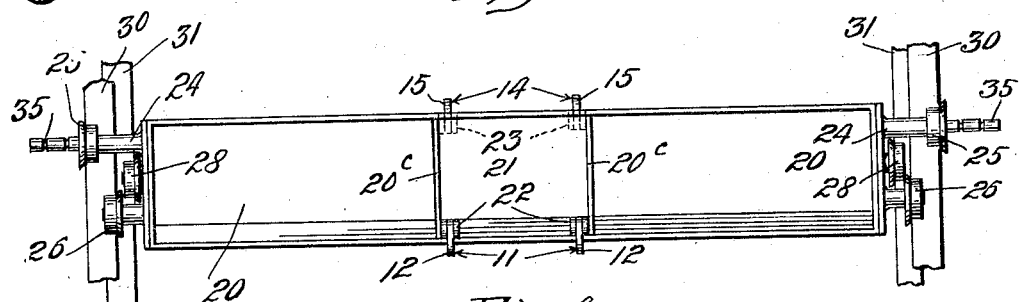
Fig. 4 is a plan view of the carrier shown in Fig. 3.

The apparatus illustrated in Figs. 1 to 7 includes a large number of collapsible carriers 10, each provided with a plurality of carrying elements 20, and means for moving these carriers past a loading station L and through a treatment space T. It will be understood that, as is customary in apparatus of this character, means (not illustrated in the drawings) are provided for moving each carrier to a dumping station after it has passed through the treatment space, and then returning it to the loading station, so that the carriers move in a closed circuit and are reused repeatedly.

At the sides of the treatment space T are fixed supports T1 carrying projecting or overhanging treatment members T2 which are entirely unconnected except for the attachment of their outer ends to the supports T1. In the particular apparatus illustrated in Figs. 1 to 7, the treatment members T2 are heating members, and each consists of a gas pipe having on its upper surface a plurality of gas burners T3. In this instance, the fixed supports T1 are also gas pipes, and serve to supply gas to the members T2 as well as to support them.

As all the carriers 10 are identical in construction, a description of one of them will suffice. Each carrier has a rear connecting member 11 which may be made in one piece, but which, for the sake of lightness, is preferably formed of two slightly separated bars 12, and a similar front connecting member 14, which may also consist of two slightly spaced bars 15. A number of trays 21 are mounted on the connecting members 11, 14. Each tray has near the middle of its upper rear edge, two projecting tabs 22 which are pivoted to inwardly projecting tabs 16 on the bars 12 of the rear connecting member 11 so as to provide a hinge connection between each tray and the rear connecting member. Each tray is similarly hinged to the front connecting member 14 by means of two tabs 23 near the middle of its front lower edge and tabs 17 on the bars 15. The distance between the adjacent hinge pivots of each connecting member is equal to the length of one of the trays 21, so that the trays may be brought into edge-to-edge relation in a common plane by bringing the front and rear connecting members as close together as possible, as shown at the left in Fig. 1 and in Figs. 6 and 7. In this position, the rear connecting member 11 lies directly over and parallel to the trays 21, while the front connecting member 14 lies directly under the trays and is also parallel to them. By spreading the connecting members apart, the trays 21 may be brought into various superimposed relations, including a relation in which they lie one directly under another. The connecting members and middle portions of the trays form a collapsible parallelogram frame so that the trays are held parallel in all positions thereof.

Secured to the sides of the uppermost tray 21a of each carrier are fittings 24 carrying two pairs of wheels 25, 26 of different gauges, and secured to the sides of the lowest tray 21b of each carrier are fittings 27 carrying a pair of wheels, 28 of a third gauge. Whenever the two upper pairs of wheels 25, 26 are supported on the same horizontal track, or on horizontal tracks at the same level, each tray 21 of the carrier will be horizontal. When the lower wheels 28 are supported on a track slightly below that supporting the upper wheels, the trays will be in edge-to-edge relation in a common plane, while, when the lower wheels are supported on a track substantially below the level of that which supports the upper wheels, the trays will be in superimposed relation.

It should be noted that the only support for the intermediate trays between the trays 21a and 21b of each carrier is the connecting members 11 and 14, and that each tray projects or overhangs at each side beyond the connecting members. These overhanging portions 20 of the trays, which are the carrying elements of the carrier, are unconnected so as to enable them to intermesh with the treating members T2, as best shown in Fig. 3.

Tracks are provided for supporting and guiding the carriers 10. There is an upper track 30 for the upper wheels 25, 26, and a lower track 31 of a slightly narrower gauge for the lower wheels 28. The arrangement of a portion of the tracks 30, 31 is shown in Fig. 1, wherein it may be seen that the two tracks extend substantially on the same level at the loading station L and on substantially different levels in the treatment space T. In the form illustrated, the distance between the two tracks and the treatment space is substantially equal to the lengths of the connecting members 11 and 14, but it may be made less than this when the size of the treatment members T2 permits, as hereinafter explained. Between the loading station L and the treatment space T, the tracks 30 and 31 diverge, as clearly shown in Fig. 1. The result is that the trays of each carrier are located edge to edge in a common horizontal plane as the carrier passes the loading station L, and are horizontal and superimposed when the carrier is in the treatment space. The movement of the carriers along the tracks is preferably automatic, and may be effected by conveyer chains 32, 33, provided with flights 34 for engaging fingers 35 on the carriers. The conveyer chain 32, which moves the carriers past the loading station, is more rapid than the treatment space conveyer chain 33, the ratio between their speeds being such that the carriers are closely spaced one behind another both at the loading station and in the treatment space. This permits the use of a continuously operating automatic loading device at the loading station. The nature of this device necessarily depends upon the nature of the material to be treated. If the material is of a somewhat viscous nature, the loading apparatus may include a chute L1, rollers L2 at the bottom of the chute, and scrapers L3. The middle portions of the trays, which are between the front and rear connecting members 11, 14 are not used, and the rollers L2 and scrapers L3 are positioned to direct the material only into the two overhanging portions 21 of each tray 20, as clearly shown in Fig. 2. To prevent the material from running into the middle portions of the trays, each tray is preferably provided with partitions 20c.

The thin layer of material which is spread upon the carrying element 20 at the loading station is broken up into short sections as the carrier moves from the loading station to the treatment space, and these sections are intermeshed with the treating members T2 so that each of them is subjected to direct heat treatment by the treating members over which it passes.

It will be understood that the spacing of the superimposed treating members corresponds to that of the trays when the carriers are extended to place the trays in superimposed position, and that the tracks are so arranged that the distance between adjacent trays of each carrier in the treatment space is sufficient to provide for one of the treating members between them.

In the modification shown in Figs. 8 to 11, the inoperative middle portions of the trays are omitted. In this instance, each carrier 10 has a central collapsible parallelogram frame which includes a rear connecting member 11', consisting of two bars 12' connected by bearing sleeves 16', in which are journalled bearing rods 22' connecting brackets 36 to which the inner sides of overhanging trays 20' are secured; and a front connecting member 14' having bars 15' and bearing sleeves 17' for bearing rods 23' which also connect the brackets 36. It is apparent that this parallelogram frame retains all the trays 20' parallel to one another, and permits those at each side of the carrier to be placed either in edge-to-edge relation as shown in Fig. 10 or in superimposed relation as shown in Figs. 8 and 9.

A further difference between the modification shown in Figs. 8 to 11 and that first described consists in the fact that the wheels 25', 26' and 28' are mounted on the connecting members 11, 14, instead of on the trays, and that the tracks 30, 31 are consequently of a much narrower gauge than those shown in the first modification.

The treating members T2' shown in Fig. 8 are arranged to direct forcible sprays of liquid directly against the thin layers of material on the carrying elements 20'. For this purpose, each treating member is provided along its lower side with spray nozzles T3'; and to permit the discharge of the liquid, the carrying elements 20' may be provided with foraminous bottoms 37, as shown in Figs. 8 and 11.

A plurality of carriers, such as the carrier 10' shown in Figs. 8 to 11, may be mounted for movement along tracks arranged in the same manner as the tracks 30, 31 shown in Fig. 1, except, of course, that each track is of a much narrower gauge. The operation is, therefore, the same as that of the first modification, except for the difference in the treatment applied to the material.

Besides the use of the apparatus for subjecting material to direct heat for cooking, drying, or other purposes, as illustrated in Fig. 3, and subjecting the material to direct treatment with a liquid or gas for washing, causing chemical reactions, or other purposes, as illustrated in Fig. 8, the apparatus may be used for any other types of treatment by merely modifying the treating members to adapt them to effect the particular treatment desired. It should be clearly understood, therefore, that the invention is by no means limited to apparatus for the treatment of any particular material nor to apparatus for effecting any particular treatment of the material.

What is claimed is:

1. A carrier, comprising a collapsible parallelogram frame, and individual carrying elements projecting laterally from said frame, unconnected at their outer ends, and so positioned that they are located edge to edge when the frame is collapsed and are superimposed when the frame is extended.

2. A carrier, comprising a rigid connecting member, a plurality of trays each hinged to said connecting member near the middle of one of its edges so that said trays may turn with respect to said connecting member, and means for retaining said trays always parallel to each other.

3. A carrier, comprising a plurality of trays, a rigid connecting member hinged to the middle portion of one front edge of each tray, and a second rigid connecting member hinged to the middle portion of the opposite back edge of each tray, the hinge axes of each connecting member being separated by distances equal to the length of the trays.

4. A balanced carrier, comprising a collapsible parallelogram frame, and a plurality of carrying elements projecting laterally from each side of said frame and unconnected at their outer ends.

In testimony whereof we have hereunto set our hands.

DAVID S. BAKER.
KENNETH M. SIMPSON.